US011652994B2

(12) United States Patent
Jiang et al.

(10) Patent No.: US 11,652,994 B2
(45) Date of Patent: May 16, 2023

(54) NEURAL IMAGE COMPRESSION WITH ADAPTIVE INTRA-PREDICTION

(71) Applicant: TENCENT AMERICA LLC, Palo Alto, CA (US)

(72) Inventors: Wei Jiang, Palo Alto, CA (US); Wei Wang, Palo Alto, CA (US); Ding Ding, Palo Alto, CA (US); Shan Liu, Palo Alto, CA (US); Xiaozhong Xu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 99 days.

(21) Appl. No.: 17/488,532

(22) Filed: Sep. 29, 2021

(65) Prior Publication Data

US 2022/0232212 A1 Jul. 21, 2022

Related U.S. Application Data

(60) Provisional application No. 63/138,963, filed on Jan. 19, 2021.

(51) Int. Cl.
*H04N 19/105* (2014.01)
*H04N 19/119* (2014.01)
*H04N 19/176* (2014.01)
*G06N 3/08* (2023.01)
(Continued)

(52) U.S. Cl.
CPC .......... *H04N 19/119* (2014.11); *G06N 3/045* (2023.01); *G06N 3/08* (2013.01); *H04N 19/105* (2014.11); *H04N 19/159* (2014.11); *H04N 19/176* (2014.11)

(58) Field of Classification Search
CPC .. H04N 19/119; H04N 19/105; H04N 19/159; H04N 19/176; G06N 3/045; G06N 3/08
See application file for complete search history.

(56) References Cited

U.S. PATENT DOCUMENTS

| 2018/0026897 A1 | 1/2018 | Eller et al. |
| 2018/0267732 A1 | 9/2018 | Blaettler et al. |
| 2020/0128307 A1 | 4/2020 | Li |

OTHER PUBLICATIONS

International Search Report dated Jan. 11, 2022 in Application No. PCT/US21/53329.

(Continued)

*Primary Examiner* — Dave Czekaj
*Assistant Examiner* — Berteau Joisil
(74) *Attorney, Agent, or Firm* — Sughrue Mion, PLLC

(57) ABSTRACT

Neural image compression with adaptive intra-prediction is performed by at least one processor and includes receiving an optimal partition and a compressed representation of an input comprising a first set of blocks, for each block in the first set of blocks, receiving a block selection signal indicating one of a first recovered block and a second recovered block as a currently recovered block, and based on the received block selection signal, performing one of a first recovery and a second recovery, and merging the currently recovered blocks to obtain a reconstructed image. The first recovery comprises compute the first recovered block based on a respective block in the first set of blocks directly. The second recovery comprises generating a recovered residual based on a computed residual, partitioning the first predicted block and adding the recovered residual to obtain the second recovered block.

20 Claims, 8 Drawing Sheets

(51) Int. Cl.
*H04N 19/159* (2014.01)
*G06N 3/045* (2023.01)

(56) References Cited

OTHER PUBLICATIONS

Written Opinion of the International Searching Authority dated Jan. 11, 2022 in Application No. PCT/US21/53329.

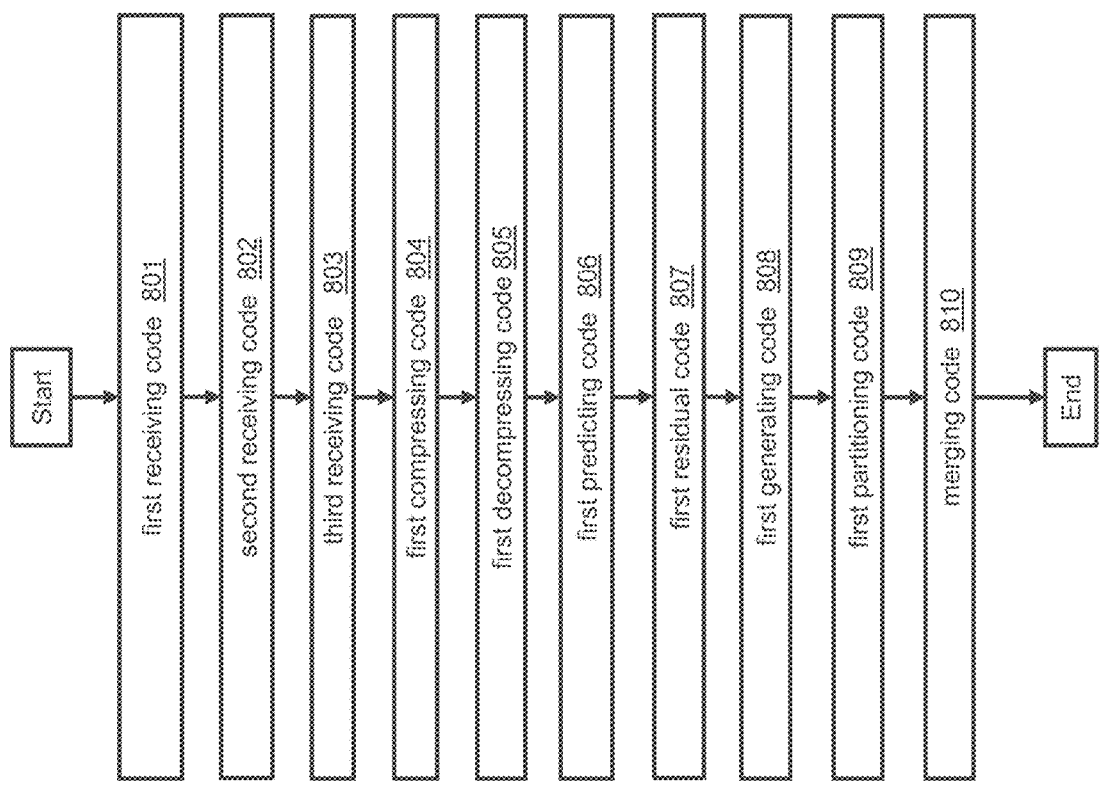

NEURAL IMAGE COMPRESSION WITH ADAPTIVE INTRA-PREDICTION

CROSS-REFERENCE TO RELATED APPLICATION

This application is based on and claims priority to U.S. Provisional Patent Application No. 63/138,963, filed on Jan. 19, 2021, the disclosure of which is incorporated by reference herein in its entirety.

BACKGROUND

Standard groups and companies have been actively searching for potential needs for standardization of future video coding technology. These standard groups and companies have established JPEG-AI groups focusing on AI-based end-to-end neural image compression using Neural Networks (NN). The success of recent approaches has brought more and more industrial interests in advanced neural image and video compression methodologies.

Given an input image x, the target of NIC uses the image x as the input to a NN encoder to compute a compressed representation $\bar{y}$ that is compact for storage and transmission, then use $\bar{y}$ as the input to a NN decoder to reconstruct an image $\bar{x}$. Previous NIC methods take a variational autoencoder (VAE) structure, where the NN encoders directly use the entire image x as its input, which is passed through a set of network layers that work like a black box to compute the output representation $\bar{y}$. Correspondingly, the NN decoders take the entire representation $\bar{y}$ as its input, which is passed through another set of network layers that work like another black box to compute the reconstructed $\bar{x}$.

The block-based intra-prediction and residual coding mechanism encodes residuals between prediction blocks and the original blocks instead of directly encoding the original whole image. This mechanism has been proven highly effective for compressing image frames in modern video coding standards like HEVC and VVC. Entire images are partitioned into blocks of various sizes, and a prediction block is generated by copying the boundary pixels of previous compressed blocks along a variety of angular directions, and then the residuals between the original block and the prediction block are compressed. Residuals can more efficiently be encoded compared to the original pixels and, therefore, better coding performance can be achieved. Different block sizes have direct impact on the compression performance, and the optimal block size usually depends on specific images.

SUMMARY

According to embodiments, a method of neural image compression with adaptive intra-prediction is performed by at least one processor and includes receiving an optimal partition, receiving a compressed representation of an input comprising a first set of blocks, for each block in the first set of blocks, receiving a block selection signal indicating one of a first recovered block and a second recovered block as a currently recovered block, and based on the received block selection signal, performing one of a first recovery and a second recovery, and merging the currently recovered blocks to obtain a reconstructed image. The first recovery comprises: compressing the block in the first set of blocks, using a first neural network, to compute a first compressed representation, and decompressing the first compressed representation, using a second neural network, to compute the first recovered block. The second recovery comprises: computing a first predicted block based on a set of previously recovered blocks and a set of previously recovered micro-blocks, computing a first residual based on a current block in the first set of blocks and the predicted block, generating a recovered residual based on the first residual, and partitioning the first predicted block and adding the recovered residual to obtain the second recovered block.

According to embodiments, an apparatus for neural image compression with adaptive intra-prediction includes at least one memory configured to store program code, and at least one processor configured to read the program code and operate as instructed by the program code. The program code including first receiving code configured to cause the at least one processor to receive an optimal partition, second receiving code configured to cause the at least one processor to receive a compressed representation of an input comprising a first set of blocks, third receiving code configured to cause the at least one processor to, for each block in the first set of blocks, receive a block selection signal indicating one of a first recovered block and a second recovered block as a currently recovered block, and execute one of a first recovery code and a second recovery code, and merging code configured to cause the at least one processor to merge each of the currently recovered blocks to obtain a reconstructed image. Further, wherein the first recovery comprises: first compressing code configured to cause the at least one processor to compress the block in the first set of blocks, using a first neural network, to compute a first compressed representation, and first decompressing code configured to cause the at least one processor to decompress the first compressed representation, using a second neural network, to compute the first recovered block, and wherein the second recovery comprises: first predicting code configured to cause the at least one processor to predict a first predicted block based on a set of previously recovered blocks and a set of previously recovered micro-blocks, first residual code configured to cause the at least one processor to compute a first residual based on a current block in the first set of blocks and the predicted block, first generating code configured to cause the at least one processor to generate a recovered residual based on the first residual, and first partitioning code configured to cause the at least one processor to partition the first predicted block and adding the recovered residual to obtain the second recovered block.

According to embodiments, a non-transitory computer-readable medium storing instructions that, when executed by at least one processor for neural image compression with adaptive intra-prediction, cause the at least one processor to receive an optimal partition, receive a compressed representation of an input comprising a first set of blocks, and for each block in the first set of blocks, receive a block selection signal indicating one of a first recovered block and a second recovered block as a currently recovered block, and execute one of a first recovery and a second recovery, and merge each of the currently recovered blocks to obtain a reconstructed image, wherein the first recovery comprises: compress the block in the first set of blocks, using a first neural network, to compute a first compressed representation, and decompress the first compressed representation, using a second neural network, to compute the first recovered block, and wherein the second recovery comprises: predict a first predicted block based on a set of previously recovered blocks and a set of previously recovered micro-blocks, compute a first residual based on a current block in the first set of blocks and the predicted block, generate a recovered residual based on the first residual, and partition the first predicted block and adding the recovered residual to obtain the second recovered block.

BRIEF DESCRIPTION OF THE DRAWINGS

FIG. 8 is a block diagram of an apparatus for neural image compression with adaptive intra-prediction, according to the embodiments.

DETAILED DESCRIPTION

Figure 1:
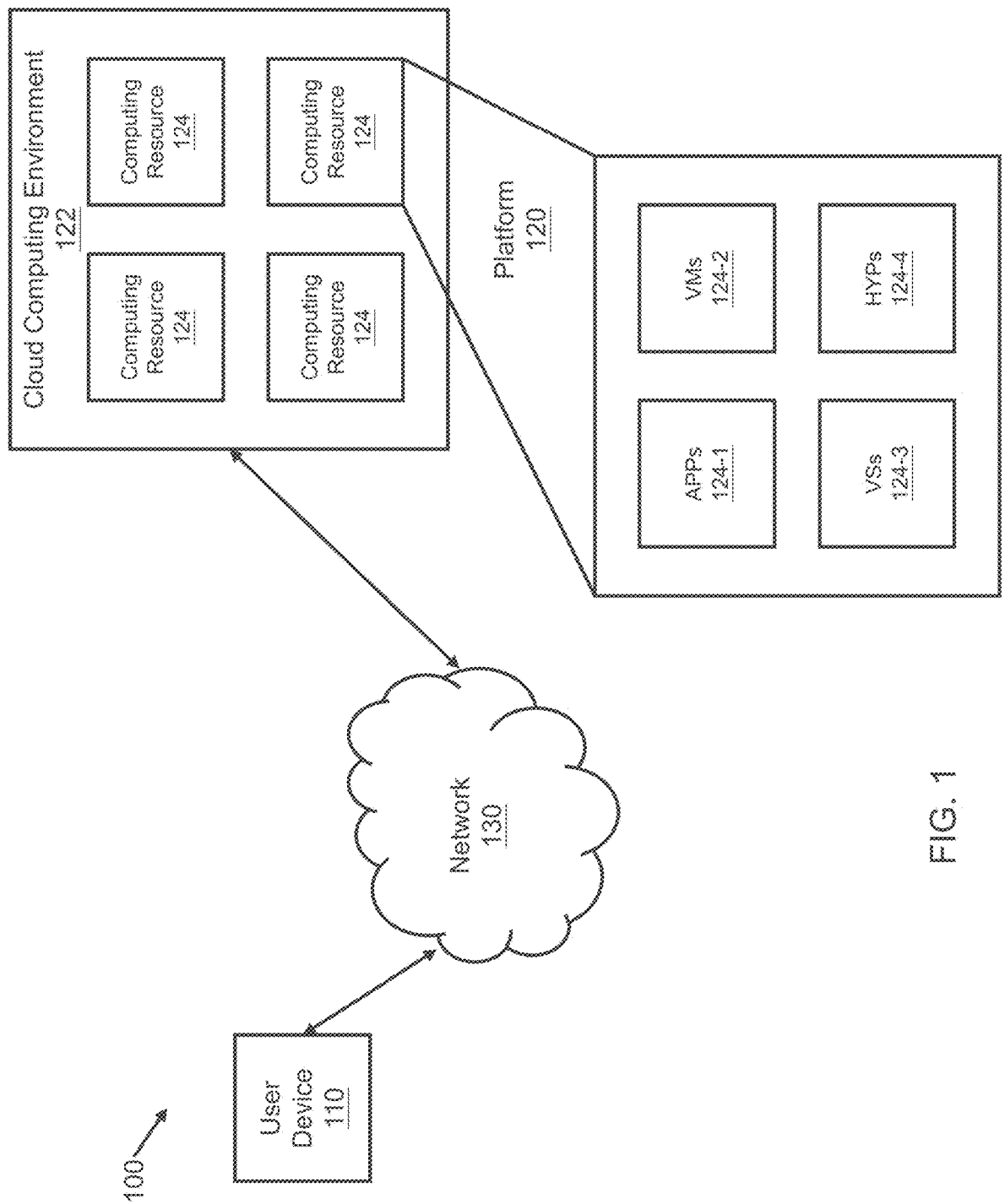
FIG. 1 is a diagram of an environment in which methods, apparatuses and systems described herein may be implemented, according to embodiments.

This disclosure proposes a Neural Image Compression (NIC) framework of compressing an input image by a Neural Network (DNN) using a block-based intra-prediction mechanism with adaptive block sizes. Example embodiments will be described below with reference to the drawings. In the drawings, the same modules are denoted by the same reference numbers, and thus a repeated description may be omitted as needed. FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
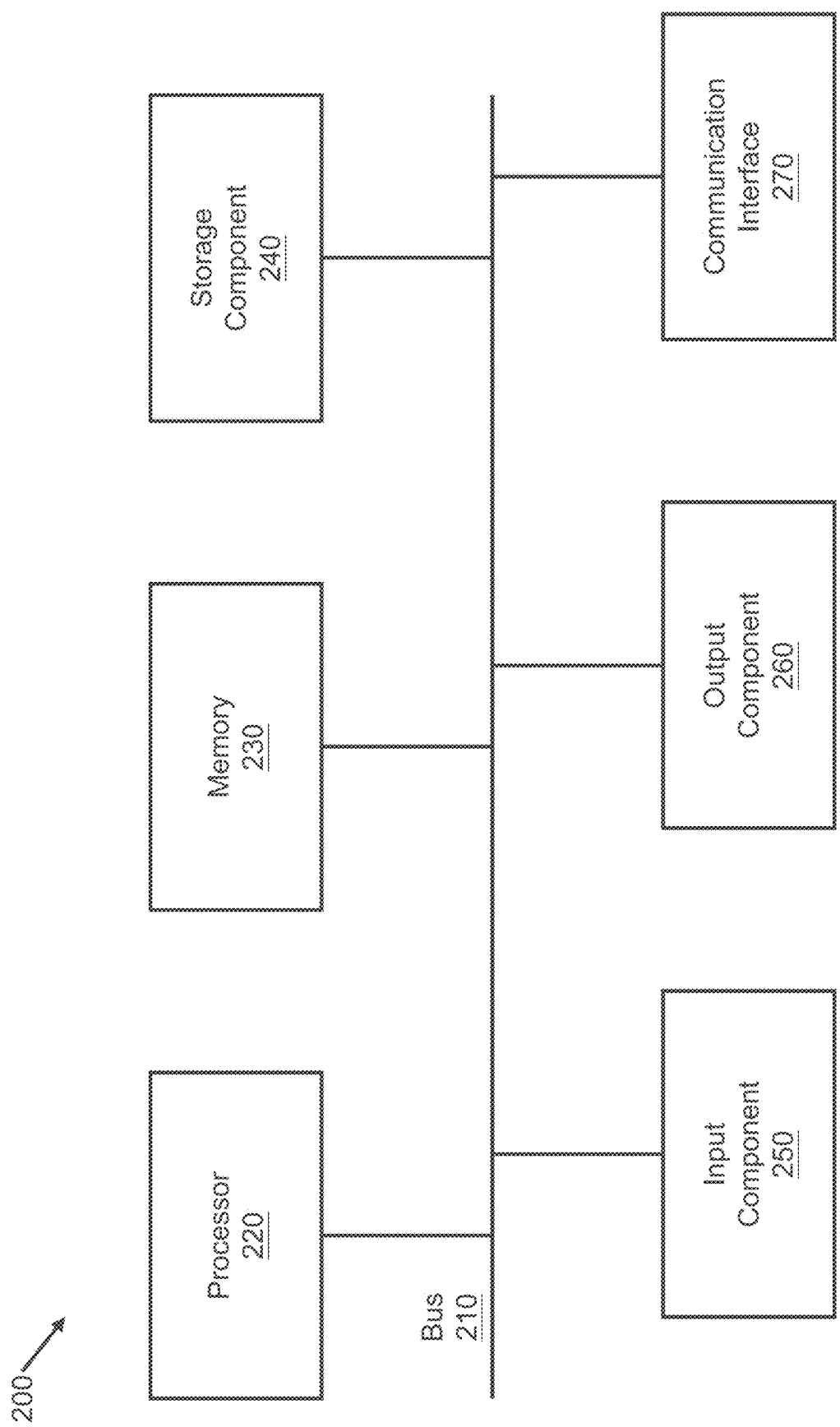
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Methods and apparatuses for NIC using block-based intra-prediction with adaptive block sizes will now be described in detail.

This disclosure proposes an NIC framework using block-based intra-prediction with adaptive block sizes. Residuals between prediction blocks and the original blocks are encoded instead of encoding the original pixels, and the block size is adaptively determined based on the compression quality such as the Rate-Distortion (R-D) loss.

Figure 3:
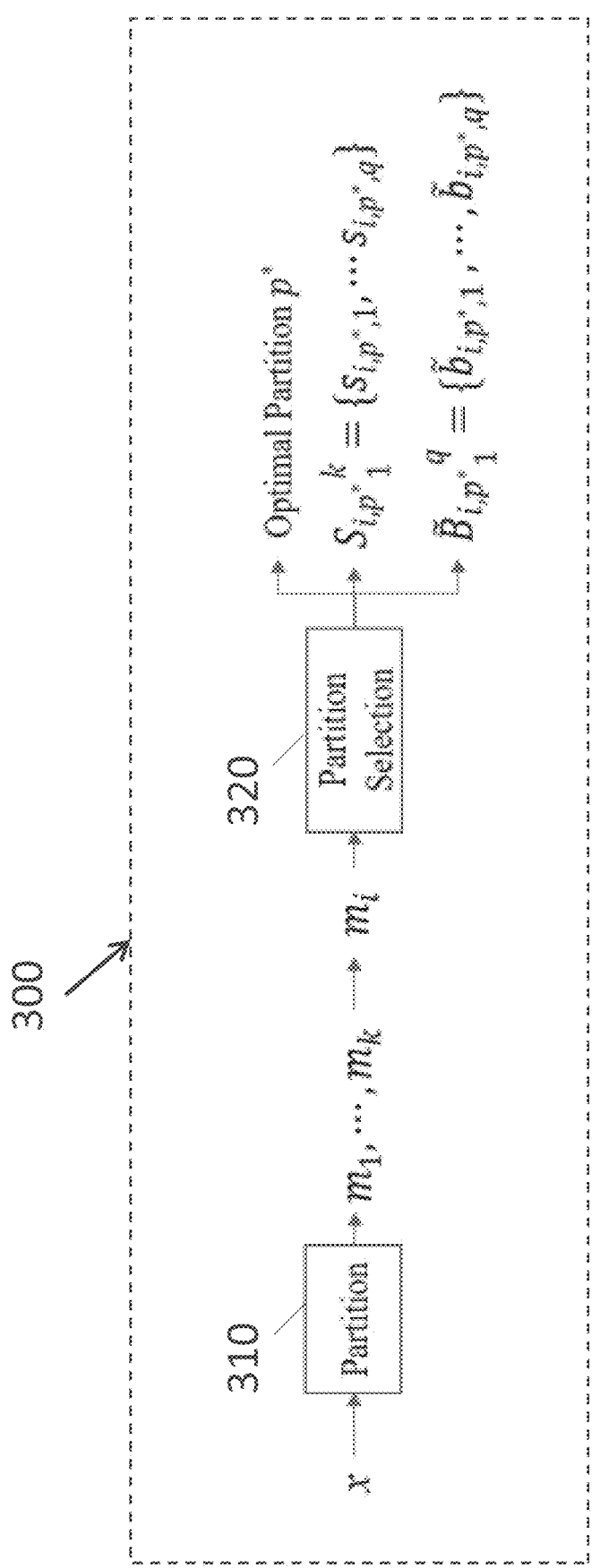
FIG. 3 is a block diagram of an NIC Encoder apparatus, during a test stage, according to embodiments.

FIG. 3 is a block diagram of an NIC encoder 300 apparatus, during a test stage, according to embodiments.

As shown in FIG. 3, the encoder 300 includes a Partition module 310 and a Partition Selection module 320.

On the encoder side, given the input image x, the Partition module 310 partitions the input image x into k micro-blocks of size $(w_m, h_m)$, $M_1^k=\{m_1, \ldots, m_k\}$, where $m_i$ denotes the i-th micro-block. Each micro-block $m_i$ may be further partitioned into blocks $b_{i,1}, \ldots, b_{i,n}$, where $b_{i,j}$ is the j-th block in the micro-block $m_i$. The size of the block $b_{i,j}$ can vary for different blocks. In an example embodiment, the micro-blocks align with the CTU partition in current video coding tools. Each CTU micro-block may be further partitioned into 2×2, 4×4, 8×8, 16×16, 32×32, or 64×64 blocks. Embodiments do not put any restrictions on the size of the CTU or how blocks in the CTU are partitioned.

Assume that there are P different ways to partition each micro-block $m_i$ into blocks. The workflow for how to determine the optimal way for partitioning in the Partition Selection module 320 will now be described in detail.

Figure 4:
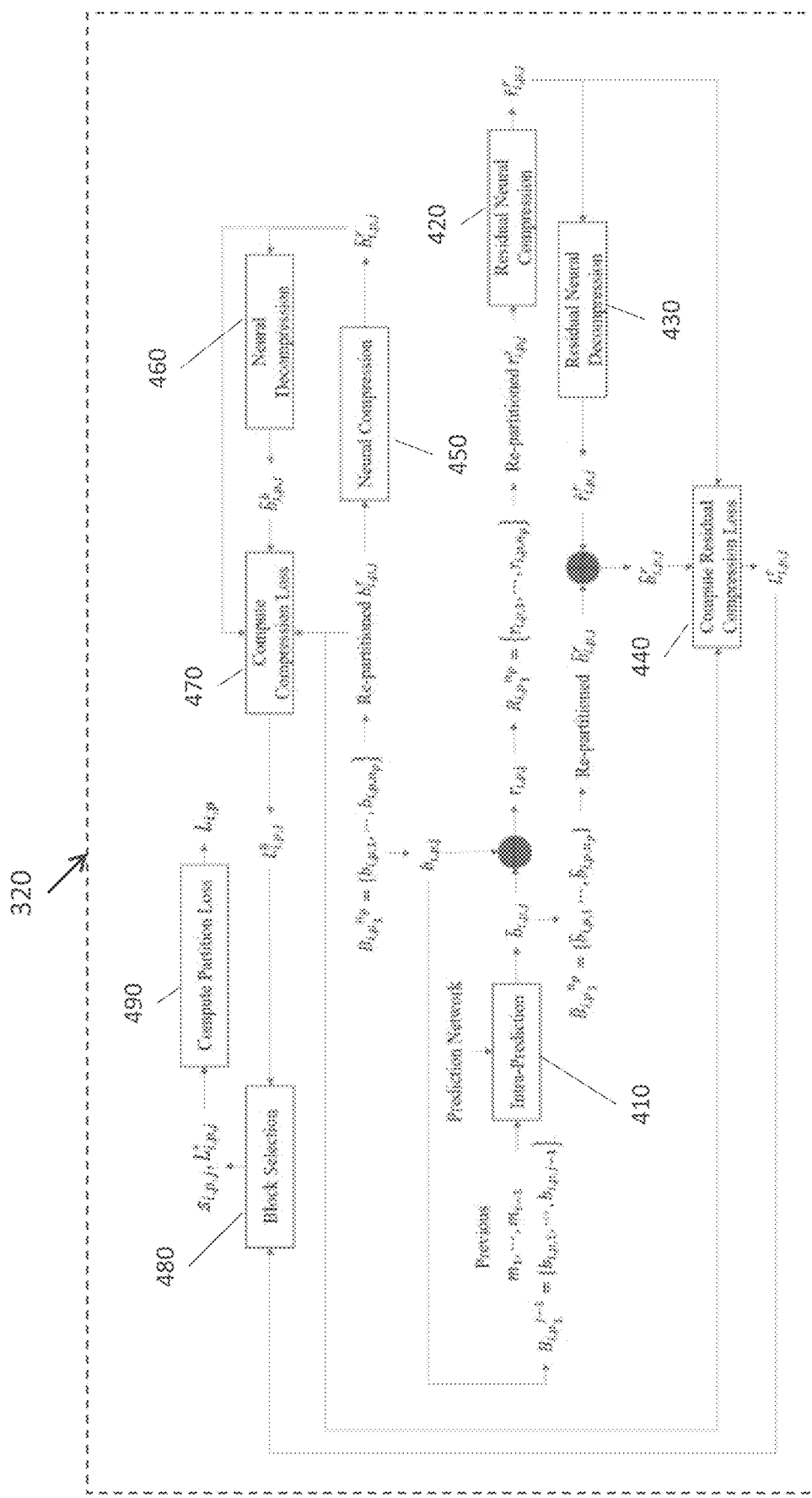
FIG. 4 is a detailed workflow of the Partition Selection module of FIG. 3, during a test stage, according to embodiments.

FIG. 4 is a detailed workflow of the Partition Selection module 320 of FIG. 3, during a test stage, according to embodiments.

As shown in FIG. 4, the Partition Selection module 320 includes an Intra-Prediction module 410, a Residual Neural Compression module 420, a Residual Neural Decompression module 430, a Compute Residual Compression Loss module 440, a Neural Compression module 450, a Neural Decompression module 460, a Compute Compression Loss module 470, a Block Selection module 480, and a Compute Partition Loss module 490.

The output of the Partition Selection module 320 include the optimal way of partition p*, a set of block selection signals $S_{i,p^*,1}^k=\{s_{i,p^*,1}, \ldots, s_{i,p^*,q}\}$, and a set of compressed representations $\tilde{B}_{i,p^*_1}^q=\{\tilde{b}_{i,p^*,1}, \ldots, \tilde{b}_{i,p^*,q}\}$. These outputs will then be sent to the decoder side (for example, decoder 500 detailed in FIG. 5), typically after being further compressed by quantization and entropy coding.

Let $B_{i,p_1}^{n_p}=\{b_{i,p,1}, \ldots, b_{i,p,n_p}\}$ denote blocks obtained by the p-th way of partition. The total number of blocks $n_p$ for this partition is automatically determined by the size of the micro-block $m_i$ and the size of the block. For each partitioned block $b_{i,p,j}$, a predicted block $\overline{b}_{i,p,j}$ may be computed by the Intra-Prediction module 410 based on a Prediction Network. The Prediction Network takes as input a set of image pixels selected from x, where the selected pixels can come from two sources: from the micro-blocks $M_1^{i-1}=\{m_1, \ldots, m_{i-1}\}$ that are encoded before the micro-block $m_i$, and from the blocks $B_{i,p_1}^{j-1}=\{b_{i,p,1}, \ldots, b_{i,p,j-1}\}$ in the micro-block $m_i$ that are encoded before the partitioned block $b_{i,p,j}$. There are many ways to select the pixels and form the input of the Prediction Network. For example, the neighboring pixels that are spatially closest to the partitioned block $b_{i,p,j}$ in a context area may be organized in some order (stacking, concatenation, spatially transformed etc.) to form the input to the Prediction Network. Through inference computation, the Prediction Network outputs the predicted block $\overline{b}_{i,p,j}$. The Prediction Network can have various architectures. For each way of partition, the Prediction Network can use a different NN model for its prediction. Typically, convolutional and fully connected layers will be used. Embodiments do not put any restrictions on the size and shape of the context area for pixel selection, the way pixels are transformed into the input of the Prediction Network, or the network architectures of the Prediction Network.

For the partitioned block $b_{i,p,j}$, after computing the predicted block $\overline{b}_{i,p,j}$, a residual $r_{i,p,j}$ may be computed based on the partitioned block $b_{i,p,j}$ and the predicted block $\overline{b}_{i,p,j}$, e.g. by subtraction. Let $R_{i,p_1}^{n_p}=\{r_{i,p,1}, \ldots, r_{i,p,n_p}\}$ denote the residual of the entire i-th micro-block $m_i$ partitioned in the p-th way. This residual $R_{i,p_1}^{n_p}$ may be re-partitioned into a set of q residual blocks $R_{i,p_1}^q=\{r_{i,p,1}^r, \ldots, r_{i,p,q}^r\}$. Note that the re-partitioning of the residual block can be the same or different from the original partitioning of the predicted blocks $\overline{b}_{i,p,j}$. When q=1, the entire micro-block will be processed as one piece. The corresponding micro-block $B_{i,p_1}^{n_p}=\{b_{i,p,1}, \ldots, b_{i,p,n_p}\}$ and predicted blocks $\overline{B}_{i,p_1}^{n_p}=\{\overline{b}_{i,p,1}, \ldots, \overline{b}_{i,p,n_p}\}$ can also be re-partitioned in the same way into a re-partitioned micro-block $B_{i,p_1}^{rq}=\{b_{i,p,1}^r, \ldots, b_{i,p,q}^r\}$ and a re-partitioned predicted block $\overline{B}_{i,p_1}^{rq}=\{\overline{b}_{i,p,1}^r, \ldots, \overline{b}_{i,p,q}^r\}$, respectively. The Residual Neural Compression module 420 may compress each residual block $r_{i,p,j}^r$ to compute a compressed residual representation $\tilde{r}_{i,p,j}^r$, which is decompressed by the Residual Neural Decompression module 430 to compute a recovered residual block $\hat{r}_{i,p,j}^r$. The recovered residual block $\hat{r}_{i,p,j}$ can be added back to corresponding re-partitioned predicted block $\overline{b}_{i,p,j}^r$ to obtain a reconstructed block $\hat{b}_{i,p,j}^r$. The Compute Residual Compression Loss module 440 computes a residual compression quality loss $L_{i,p,j}^r$ based on the re-partition micro-block $b_{i,p,j}^r$, the reconstructed block $\hat{b}_{i,p,j}^r$ and the compressed residual representation $\tilde{r}_{i,p,j}^r$. For example, in an example embodiment, the Rate-Distortion (R-D) loss may be computed as the quality measurement (residual quality loss), as follows:

$$L_{i,p,j}^r = \lambda D(b_{i,p,j}^r, \hat{b}_{i,p,j}^r) + R(\tilde{r}_{i,p,j}^r) \tag{1}$$

Where $D(b_{i,p,j}^r, \hat{b}_{i,p,j}^r)$ is the distortion between the re-partition micro-block $b_{i,p,j}^r$ and the reconstructed block $\hat{b}_{i,p,j}^r$. $R(\tilde{r}_{i,p,j}^r)$ is the rate loss measuring the bit consumption of the compressed residual representation $\tilde{r}_{i,p,j}^r$. $\lambda$ is a trade-off hyperparameter balancing the importance of different terms. Other compression quality loss can certainly be used here. Embodiments do not put any restrictions on the specific measurement used for the compression quality loss, the distortion, or the rate loss.

At the same time, each original block $b_{i,p,j}^r$ may be directly compressed by the Neural Compression module 450 to compute a compressed representation $\tilde{b}_{i,p,j}^r$, which is decompressed by the Neural Decompression module 460 to compute a recovered block $\hat{b}_{i,p,j}^b$ directly. A compression quality loss $L_{i,p,j}^b$ may be computed in the Compute Compression Loss module 470 based on the original block $b_{i,p,j}^r$, the reconstructed block $\hat{b}_{i,p,j}^b$, and the compressed representation $\tilde{b}_{i,p,j}^r$ in the same way as the residual quality loss $L_{i,p,j}^r$. Based on the compression quality loss $L_{i,p,j}^b$ and the residual quality loss $L_{i,p,j}^r$, the Block Selection module 480 generates a selection signal $s_{i,p,j}$ to indicate whether the residual block $r_{i,p,j}^r$ or the original $b_{i,p,j}^r$ will be used to generate the compressed residual representation $\tilde{r}_{i,p,j}^r$ or the compressed representation $\tilde{b}_{i,p,j}^r$, e.g., by selecting the option with less quality loss. This gives the optimal quality loss $L^*_{i,p,j}$ for compressing the current j-th block $b_{i,p,j}^r$, e.g., $L^*_{i,p,j}=\min(L_{i,p,j}^b, L_{i,p,j}^r)$. The Compute Partition Loss module 490 computes the overall quality loss $L_{i,p}$ for the p-th way of partition of micro-block $m_i$ as:

$$L_{i,p} = \sum_{j=1}^{q} w_{i,p,j} L_{i,p,j}^{*} \qquad (2)$$

Where each $w_{i,p,j}$ is a weight associated with the original block $b_{i,p,j}{}^r$. By simply setting all weights to be 1, all blocks are treated equally. Some blocks may be treated with more attention than others, and an attention map (or significance map) can be used to obtain the weights.

By repeating the same process for all P ways of partition, the quality loss $L_{i,p}$, p=1, . . . , P may be obtained. The optimal way of partition p* can then be selected, e.g., as the partition with the optimal loss (i.e. $p^{*}=\mathrm{argmin}_p L_{i,p}$, $L^{*}_i = \mathrm{min}_p L_{i,p}$). The corresponding block selection signals $S_{i,p^{*}_1}{}^k = \{s_{i,p^{*},1}, \ldots, s_{i,p^{*},q}\}$ may also be determined as output of the Partition Selection module 320.

Let $B_{i,p^{*}_1}{}^{n_{p^{*}}} = \{b_{i,p^{*},1}, \ldots, b_{i,p^{*},n_{p^{*}}}\}$ denote the selected optimally partitioned blocks for micro-block $m_i$. According to the block selection signal $s_{i,p^{*},j}$, the corresponding compressed residual representation $\tilde{r}_{i,p^{*},j}{}^r$ or the compressed representation $\tilde{b}_{i,p^{*},j}{}^r$ can also be determined to be the actual compressed representation $\tilde{b}_{i,p^{*},j}{}^r$ for block $b_{i,p^{*},j}{}^r$. The set of compressed representations $\tilde{B}_{i,p^{*}_1}{}^q = \{\tilde{b}_{i,p^{*},1}, \ldots, \tilde{b}_{i,p^{*},q}\}$ are also output from the Partition Selection module 320. The optimal partition p*, the compressed representation $\tilde{B}_{i,p^{*}_1}{}^q$, and the block selection signals $S_{i,p^{*}_1}{}^q$ are further encoded, e.g., through quantization and entropy encoding, to generate the encoded stream and sent to the decoder side (detailed in FIG. 5).

The Neural Compression module 450 and the Residual Neural Compression module 420 can use any neural compression methods. Embodiments do not put any restrictions on the specific methods or network architectures used for these two modules.

Figure 5:
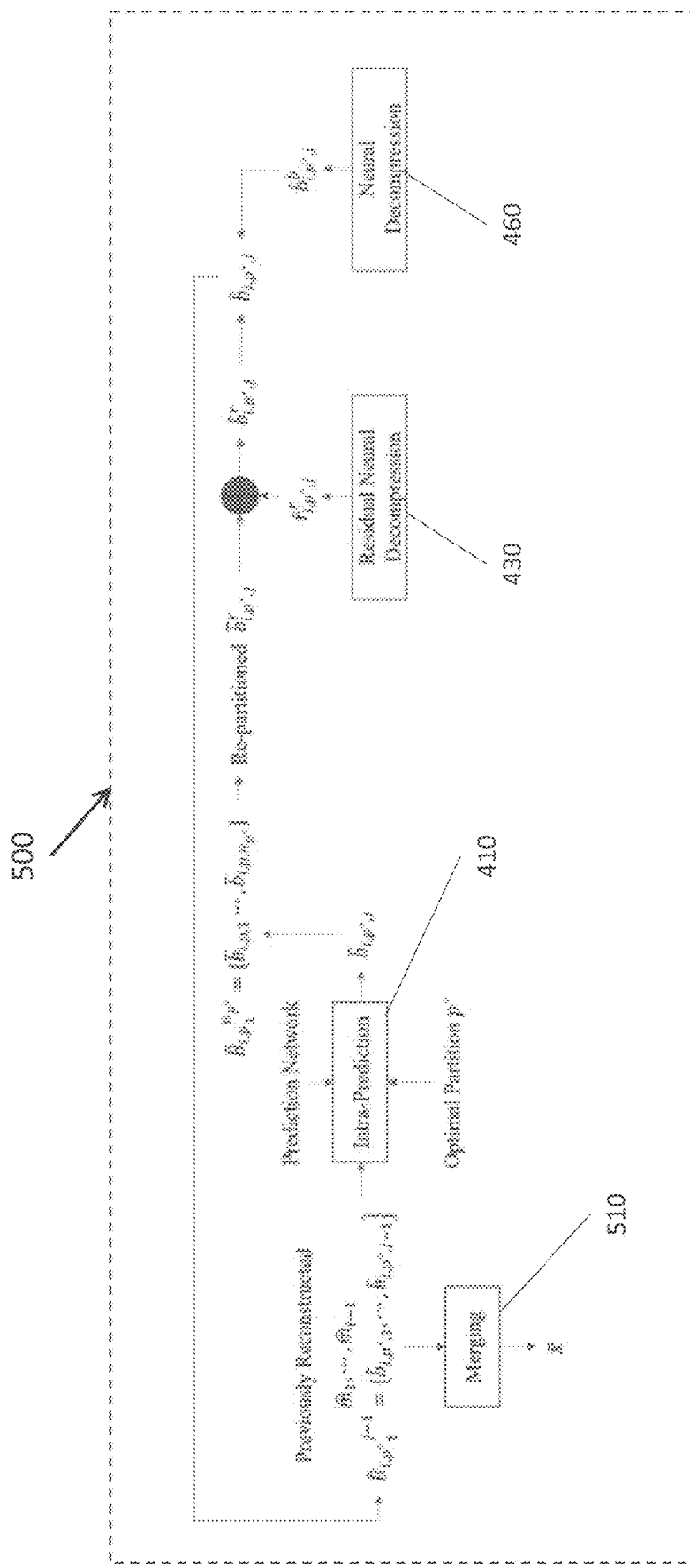
FIG. 5 is a block diagram of an NIC Decoder apparatus, during a test stage, according to embodiments.

FIG. 5 is a block diagram of an NIC decoder 500 apparatus, during a test stage, according to embodiments.

As shown in FIG. 5, the decoder 500 includes the Intra-Prediction module 410, the Residual Neural Decompression module 430, the Neural Decompression module 460, and a Merging module 510.

On the decoder 500 side, the system receives the optimal partition p*, the compressed representation $\tilde{B}_{i,p^{*}_1}{}^q$, and the block selection signals $S_{i,p^{*}_1}{}^q = \{s_{i,p^{*},1}, \ldots s_{i,p^{*},q}\}$ (typically recovered from the received bitstream by entropy decoding and dequantization). Based on each block selection signal $s_{i,p^{*},j}$, the system selects one of the following methods to compute the recovered block $\hat{b}_{i,p^{*},j}$. If the selection signal $s_{i,p^{*},j}$ indicates that the recovered block comes from the decoded block based on the compressed representation $\tilde{b}_{i,p,j}{}^r$ on the encoder 300 side, the Neural Decompression module 460 will be used to compute the recovered block $\hat{b}_{i,p^{*},j}{}^b$. If the selection signal $s_{i,p^{*},j}$ indicates that the recovered block comes from the decoded block based on the compressed residual representation $\tilde{r}_{i,p,j}{}^r$ on the encoder 300 side, the Residual Neural Decompression module 430 will be used to compute the recovered residual $\hat{r}_{i,p^{*},j}{}^r$. In the case where the recovered residual $\hat{r}_{i,p^{*},j}{}^r$ is used, based on the set of previously recovered blocks $\hat{B}_{i,p^{*}}{}^{i-1} = \{\hat{b}_{i,p^{*},1}, \ldots, \hat{b}_{i,p^{*},j-1}\}$ and previously recovered micro-blocks $\hat{m}_1, \ldots, \hat{m}_{i-1}$, the Intra-Prediction module 410 computes the predicted block $\overline{b}_{i,p^{*},j}$ by using the Prediction Network the same way it is computed in the encoder 300. The only difference being that, on the encoder 300 side, the input of the Prediction Network is formed by pixels of the original input image x. On the decoder 500 side, the inputs are from the corresponding recovered blocks and micro-blocks. The recovered residual $\hat{r}_{i,p^{*},j}{}^r$ can then be added back to the re-partitioned (in the same way as the encoder 300) predicted block $\overline{b}_{i,p^{*},j}{}^r$ to obtain the recovered block $\hat{b}_{i,p^{*},j}{}^r$. Either of the computed recovered block ($\hat{b}_{i,p^{*},j}$ or $\hat{b}_{i,p^{*},j}{}^b$) will give the actual recovered block $\hat{b}_{i,p^{*},j}$, and the decoder moves on to process the next block. Finally, the recovered blocks $\hat{B}_{i,p^{*}_1}{}^{n_{p^{*}}} = \{\hat{b}_{i,p^{*},1}, \ldots, \hat{b}_{i,p^{*},n_{p^{*}}}\}$ of micro-block $m_i$ will be aggregated into the reconstructed image $\overline{x}$ in the Merging module 510. In some embodiment, the Merging module 510 can further process the recovered blocks to remove the artifacts, such as deblocking, denoising, etc. Embodiments do not put any restrictions on the specific methods for how the recovered blocks are aggregated into the reconstructed image $\overline{x}$.

Figure 6:
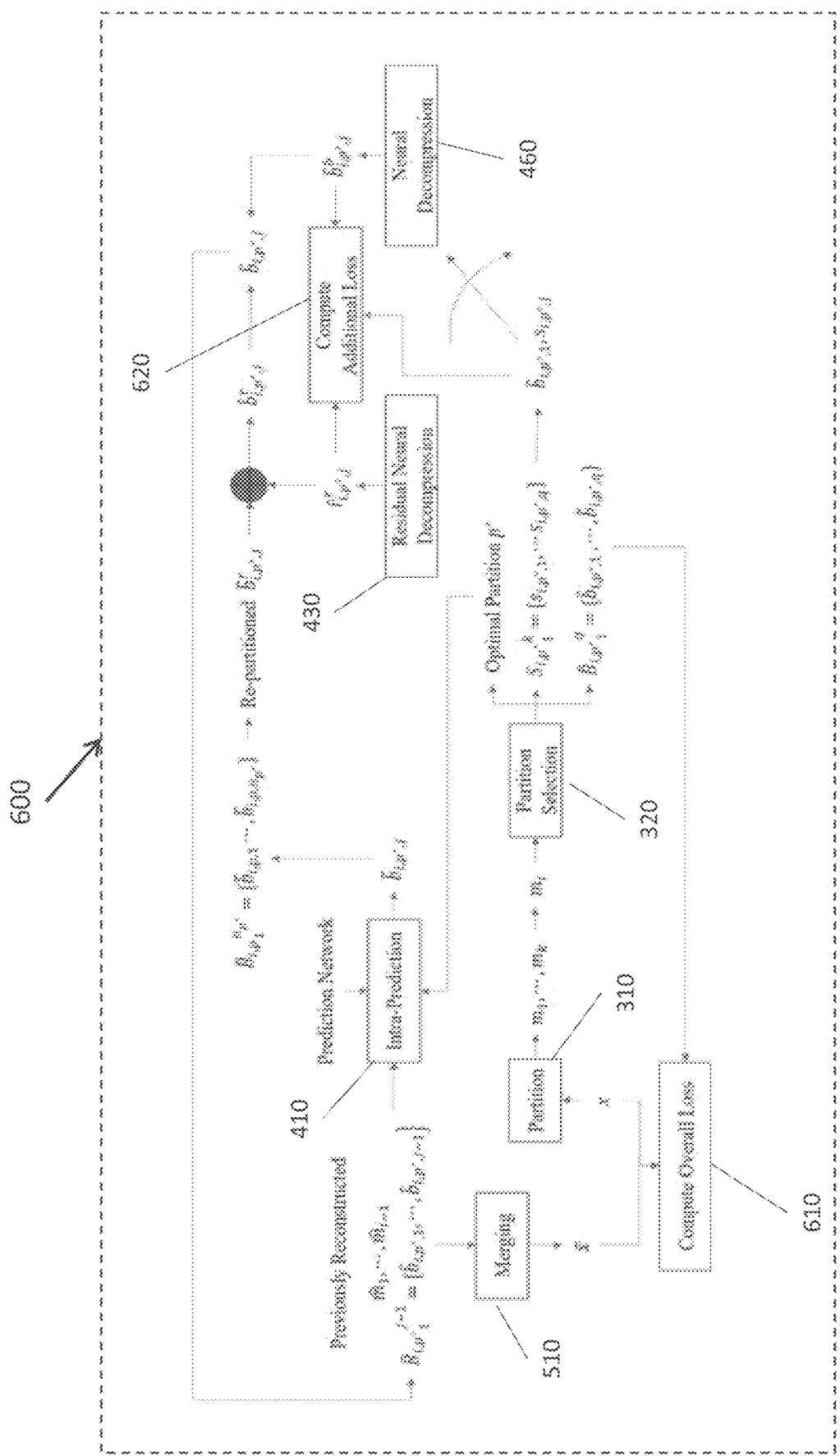
FIG. 6 is a workflow of a NIC intra-prediction apparatus, during a training stage, according to embodiments.

The NIC intra-prediction training process will now be described. FIG. 6 is a workflow of a NIC intra-prediction apparatus 600, during a training stage, according to embodiments.

As shown in FIG. 6, the NIC intra-prediction training apparatus 600 includes the Partition module 310, the Partition Selection module 320, the Intra-Prediction module 410, the Residual Neural Decompression module 430, the Neural Decompression module 460, the Merging module 510, a Compute Overall Loss module 610, and a Compute Additional Loss module 620.

The target of the training process is to learn the Prediction Network, the Neural Compression module 450, the Neural Decompression module 460, the Residual Neural Compression module 420, and the Residual Neural Decompression module 430. In the case where the learnable Merging module 510 and Block Selection module 480 are used, e.g., when an NN is used for aggregating recovered blocks into the recovered image, the corresponding learnable parameters can also be learned in the training process. In the training process, the weight coefficients of the above networks and modules to be learned are initialized, for example, by using pre-trained models, or by setting their parameters to random numbers. Then, given an input training image x, it is passed through the encoder 300 described in FIG. 3, followed by the decoder 500 described in FIG. 5, to compute the optimal partition p*, the compressed representation $\tilde{B}_{i,p^{*}_1}{}^q = \{\tilde{b}_{i,p^{*},1}, \ldots, \tilde{b}_{i,p^{*},q}\}$, the block selection signals $S_{i,p^{*}_1}{}^k = \{s_{i,p^{*},1}, \ldots, s_{i,p^{*},d,q}\}$ for each micro-block $m_i$, and the final reconstructed image $\overline{x}$. A distortion loss $D(x, \overline{x})$ may be computed, such as the traditional PSNR, MS-SSIM, or a weighted combination of both. A rate loss $R(\tilde{B}_{i,p^{*}_1}{}^q)$ may be computed to measure the bit consumption of the compressed representation $\tilde{B}_{i,p^{*}_1}{}^q$. Therefore, an overall R-D loss $L(x, \overline{x}, \tilde{B}_{1,p^{*}_1}{}^q, \ldots, \tilde{B}_{k,p^{*}_1}{}^q)$ can be computed in the Compute Overall Loss module 610:

$$L(x, \overline{x}, \tilde{B}_{1,p^{*}_1}^{q}, \ldots, \tilde{B}_{k,p^{*}_1}^{q}) = \alpha D(x, \overline{x}) + \sum_{i=1}^{k} \beta_i R(\tilde{B}_{i,p^{*}_1}^{q}) \qquad (3)$$

Where $\alpha$, $\beta_i$ are hyperparameters balancing the importance of different terms.

Other forms of loss, such as the distortion loss $D(r_{i,p^{*},j}{}^r, \hat{r}_{i,p^{*},j}{}^r)$ between the recovered residual $\hat{r}_{i,p^{*},j}{}^r$ and the original residual $r_{i,p^{*},j}{}^r$, and the distortion loss $D(b_{i,p^{*},j}{}^r, \hat{b}_{i,p^{*},j}{}^b)$ may also be computed in the Compute Additional Loss module 620, e.g., the MSE or SSIM measurements. $D(r_{i,p^{*},j}{}^r, \hat{r}_{i,p^{*},j}{}^r)$ and $D(b_{i,p^{*},j}{}^r, \hat{b}_{i,p^{*},j}{}^b)$ can also be optionally combined with the overall R-D loss $L(x, \overline{x}, \tilde{B}_{1,p^{*}_1}{}^q, \ldots, \tilde{B}_{k,p^{*}_1}{}^q)$ into a final loss of the entire system. The gradient of the final loss can be computed and back-propagated to update the learnable parameters in the system. Note that, different components (i.e., networks or modules) can be updated at different times with different updating frequencies. In some embodiments, some components or part of the parameters in some components can be pre-trained and fixed, and the training process only updates the remaining parameters.

Figure 7:
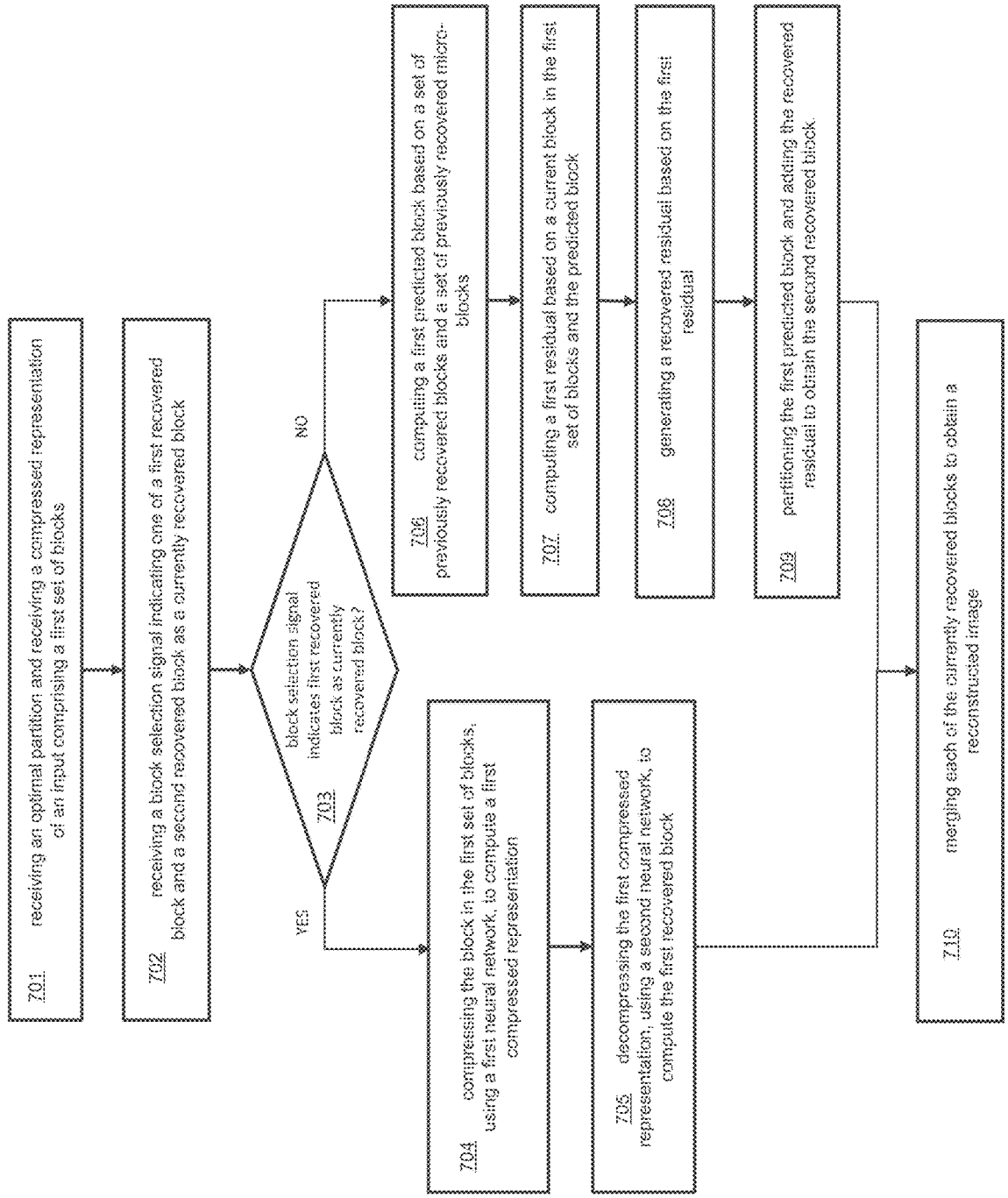
FIG. 7 is a flowchart of a method of neural image compression with adaptive intra-prediction, according to the embodiments.

FIG. 7 is a flowchart of a method of neural image compression with adaptive intra-prediction, according to the embodiments.

In some implementations, one or more process blocks of FIG. 7 may be performed by the platform 120. In some implementations, one or more process blocks of FIG. 7 may be performed by another device or a group of devices separate from or including the platform 120, such as the user device 110. Although FIG. 7 shows example blocks of the method, in some implementations, the method may include additional blocks, fewer blocks, different blocks, or differently arranged blocks than those depicted in FIG. 7. Additionally, or alternatively, two or more of the blocks of the method may be performed in parallel.

As shown in FIG. 7, in operation 701, the method includes receiving an optimal way of partition and receiving a compressed representation of an input comprising a first set of blocks. Operations 702-709 are performed for each block in the first set of blocks.

In operation 702, the method of FIG. 7 includes receiving a block selection signal indicating one of a first recovered block and a second recovered block as a currently recovered block.

In operation 703, based on the selection signal the method continues to one of operations 704-705 or operations 706-709.

In operation 704, the method of FIG. 7 includes compressing the block in the first set of blocks, using a first neural network, to compute a first compressed representation.

In operation 705, the method of FIG. 7 includes decompressing the first compressed representation, using a second neural network, to compute the first recovered block.

In operation 706, the method of FIG. 7 includes computing a first predicted block based on a set of previously recovered blocks and a set of previously recovered micro-blocks.

In operation 707, the method of FIG. 7 includes computing a first residual based on a current block in the first set of blocks and the predicted block.

In operation 708, the method of FIG. 7 includes generating a recovered residual based on the first residual.

In operation 709, the method of FIG. 7 includes partitioning the first predicted block and adding the recovered residual to obtain the second recovered block.

In operation 710, the method of FIG. 7 includes merging each of the currently recovered blocks to obtain a reconstructed image.

FIG. 8 is a block diagram of an apparatus for neural image compression with adaptive intra-prediction, according to the embodiments.

As shown in FIG. 8, the apparatus includes first receiving code 801, second receiving code 802, third receiving code 803, first compressing code 804, first decompressing code 805, first predicting code 806, first residual code 807, first generating code 808, first partitioning code 809, and merging code 810.

The first receiving code 801 is configured to cause at least one processor to receive an optimal way of partition.

The second receiving code 802 configured to cause the at least one processor to receive a compressed representation of an input comprising a first set of blocks, and for each block in the first set of blocks.

The third receiving code 803 configured to cause the at least one processor to receive a block selection signal indicating one of a first recovered block and a second recovered block as a currently recovered block.

The first compressing code 804 configured to cause the at least one processor to compress the block in the first set of blocks, using a first neural network, to compute a first compressed representation.

The first decompressing code 805 configured to cause the at least one processor to decompress the first compressed representation, using a second neural network, to compute the first recovered block.

The first predicting code 806 configured to cause the at least one processor to predict a first predicted block based on a set of previously recovered blocks and a set of previously recovered micro-blocks.

The first residual code 807 configured to cause the at least one processor to compute a first residual based on a current block in the first set of blocks and the predicted block.

The first generating code 808 configured to cause the at least one processor to generate a recovered residual based on the first residual.

The first partitioning code 809 configured to cause the at least one processor to partition the first predicted block and adding the recovered residual to obtain the second recovered block.

The merging code 810 configured to cause the at least one processor to merge each of the currently recovered blocks to obtain a reconstructed image.

Although FIG. 8 shows example blocks of the apparatus, in some implementations, the apparatus may include additional blocks, fewer blocks, different blocks, or differently arranged blocks than those depicted in FIG. 8. Additionally, or alternatively, two or more of the blocks of the apparatus may be combined.

The embodiments describe the idea of adaptive block partition and block compression method selection using intra-prediction with the original image pixels, and the idea of using different block sizes for intra-prediction residual generation and block-wise neural compression. This method of NIC encoding and decoding advantageously results in a flexible and general framework that accommodates different intra-prediction methods, different neural compression methods for both residuals and original image blocks, different micro-block and block partitions.

The proposed NIC coding methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of neural image compression with adaptive intra-prediction, the method being performed by at least one processor, and the method comprising:
    receiving an optimal partition;
    receiving a compressed representation of an input comprising a first set of blocks;
    for each block in the first set of blocks, receiving a block selection signal indicating one of a first recovered block and a second recovered block as a currently recovered block, and based on the received block selection signal, performing one of a first recovery and a second recovery; and
    merging the currently recovered blocks to obtain a reconstructed image;
    wherein the first recovery comprises:
        compressing the block in the first set of blocks, using a first neural network, to compute a first compressed representation; and
        decompressing the first compressed representation, using a second neural network, to compute the first recovered block, and
    wherein the second recovery comprises:
        computing a first predicted block based on a set of previously recovered blocks and a set of previously recovered micro-blocks;
        computing a first residual based on a current block in the first set of blocks and the predicted block;
        generating a recovered residual based on the first residual; and
        partitioning the first predicted block and adding the recovered residual to obtain the second recovered block.

2. The method of claim 1, further comprising:
    partitioning the input into a set of micro-blocks, and re-partitioning each micro-block in the set of micro-blocks into a second set of blocks, and for each block:
    computing a second predicted block based on a set of pixels selected from the input;
    performing a first computation and a second computation simultaneously; and
    generating the block selection signal based on the first computation and the second computation,
    wherein the first computation comprises:
        computing a second residual based on a block in the second set of blocks and the second predicted block;
        generating a second reconstructed block, based on a second compressed residual representation; and
        computing a first quality loss based on the second set of blocks, the second reconstructed block, and the second compressed residual representation,
    wherein the second computation comprises:
        compressing the block in the second set of blocks to compute a second compressed representation;
        decompressing the second compressed representation to compute a third recovered block; and
        generating a second quality loss, based on the second set of blocks, the third recovered block and the second compressed representation.

3. The method of claim 2, wherein based on the first quality loss being less than the second quality loss, the block selection signal indicates that the second residual will be used to generate the second compressed residual representation, and
    wherein based on the second quality loss being less than the first quality loss, the block selection signal indicates that the block in the second set of blocks will be used to generate the compressed representation.

4. The method of claim 1, further comprising:
    partitioning the first residual into first residual blocks;
    wherein the recovered residual is generated by compressing a block included in the first residual blocks, using a third neural network, to obtain a first compressed residual representation; and
    wherein the first compressed residual representation is decompressed, using a fourth neural network, to obtain the recovered residual.

5. The method of claim 4, wherein each of the first neural network, second neural network, third neural network, and fourth neural network are trained by:
    initializing a weight coefficient; and
    computing an overall loss and back-propagating a gradient of the overall loss to update a learnable parameter.

6. The method of claim 2, wherein the set of pixels are selected from one of the set of previously recovered blocks and the set of previously recovered micro-blocks.

7. The method of claim 2, further comprising:
    partitioning the input in a plurality of ways,
    wherein the optimal way of partition is a way of partitioning the input resulting in a least quality loss from the second set of blocks.

8. An apparatus for neural image compression with adaptive intra-prediction, the apparatus comprising:
    at least one memory configured to store program code; and
    at least one processor configured to read the program code and operate as instructed by the program code, the program code comprising:
    first receiving code configured to cause the at least one processor to receive an optimal partition;

second receiving code configured to cause the at least one processor to receive a compressed representation of an input comprising a first set of blocks;

third receiving code configured to cause the at least one processor to, for each block in the first set of blocks, receive a block selection signal indicating one of a first recovered block and a second recovered block as a currently recovered block, and execute one of a first recovery code and a second recovery code; and merging code configured to cause the at least one processor to merge each of the currently recovered blocks to obtain a reconstructed image, wherein the first recovery comprises:

first compressing code configured to cause the at least one processor to compress the block in the first set of blocks, using a first neural network, to compute a first compressed representation; and first decompressing code configured to cause the at least one processor to decompress the first compressed representation, using a second neural network, to compute the first recovered block;

wherein the second recovery comprises:

first predicting code configured to cause the at least one processor to predict a first predicted block based on a set of previously recovered blocks and a set of previously recovered micro-blocks;

first residual code configured to cause the at least one processor to compute a first residual based on a current block in the first set of blocks and the predicted block;

first generating code configured to cause the at least one processor to generate a recovered residual based on the first residual; and first partitioning code configured to cause the at least one processor to partition the first predicted block and adding the recovered residual to obtain the second recovered block.

9. The apparatus of claim 8, further comprising:

second partitioning code configured to cause the at least one processor to partition the input into a set of micro-blocks and re-partition each micro-block in the set of micro-blocks into a second set of blocks, and for each block:

second predicting code configured to cause the at least one processor to predict a second predicted block based on a set of pixels selected from the input;

executing code configured cause the at least one processor to execute a first computation and a second computation simultaneously;

block selection code configured to cause the at least one processor to generate the block selection signal based on the first computation and the second computation, wherein the first computation comprises:

first residual code configured to cause the at least one processor to compute a second residual based on a block in the second set of blocks and the second predicted block;

second generating code configured to cause the at least one processor to generate a second reconstructed block, based on a second compressed residual representation; and first quality loss code configured to cause the at least one processor to compute a first quality loss based on the second set of blocks, the second reconstructed block, and the second compressed residual representation, wherein the second computation comprises:

second compressing code configured to cause the at least one processor to compress the block in the second set of blocks to compute a second compressed representation;

second decompressing code configured to cause the at least one processor to decompress the second compressed representation to compute a third recovered block; and second quality loss code configured to cause the at least one processor to compute a second quality loss, based on the second set of blocks, the third recovered block and the second compressed representation.

10. The apparatus of claim 8, wherein based on the first quality loss being less than the second quality loss, the block selection signal indicates that the second residual will be used to generate the second compressed residual representation, and wherein based on the second quality loss being less than the first quality loss, the block selection signal indicates that the block in the second set of blocks will be used to generate the compressed representation.

11. The apparatus of claim 8, further comprising:

residual partitioning code configured to cause at least one of the processors to partition the first residual into first residual blocks, wherein the recovered residual is generated by compressing a block included in the first residual blocks, using a third neural network, to obtain a first compressed residual representation; and wherein the first compressed residual representation is decompressed, using a fourth neural network, to obtain the recovered residual.

12. The apparatus of claim 11, wherein each of the first neural network, second neural network, third neural network, and fourth neural network are trained by:

initializing a weight coefficient; and computing an overall loss and back-propagating a gradient of the overall loss to update a learnable parameter.

13. The apparatus of claim 9, wherein the set of pixels are selected from one of the set of previously recovered blocks and the set of previously recovered micro-blocks.

14. The apparatus of claim 9, wherein the second partitioning code is further configured to cause the at least one processor to:

partition the input in a plurality of ways, wherein the optimal partition is a way of partitioning the input resulting in a least quality loss from the second set of blocks.

15. A non-transitory computer-readable medium storing instructions that, when executed by at least one processor for neural image compression with adaptive intra-prediction, cause the at least one processor to:

receive an optimal partition;

receive a compressed representation of an input comprising a first set of blocks;

for each block in the first set of blocks, receive a block selection signal indicating one of a first recovered block and a second recovered block as a currently recovered block, and execute one of a first recovery and a second recovery;

merge each of the currently recovered blocks to obtain a reconstructed image, wherein the first recovery comprises:

compress the block in the first set of blocks, using a first neural network, to compute a first compressed representation; and decompress the first compressed representation, using a second neural network, to compute the first recovered block, wherein the second recovery comprises:
  predict a first predicted block based on a set of previously recovered blocks and a set of previously recovered micro-blocks;
  compute a first residual based on a current block in the first set of blocks and the predicted block;
  generate a recovered residual based on the first residual; and
  partition the first predicted block and adding the recovered residual to obtain the second recovered block.

16. The non-transitory computer-readable medium of claim 15, wherein the instructions, when executed by the at least one processor, further causes the at least one processor to:
  partition the input into a set of micro-blocks and re-partition each micro-block in the set of micro-blocks into a second set of blocks, and for each block:
  predict a second predicted block based on a set of pixels selected from the input;
  execute a first computation and a second computation simultaneously;
  generate the block selection signal based on the first computation and the second computation,
    wherein the first computation comprises:
      compute a second residual based on a block in the second set of blocks and the second predicted block;
      generate a second reconstructed block, based on a second compressed residual representation; and
      compute a first quality loss based on the second set of blocks, the second reconstructed block, and the second compressed residual representation,
    wherein the second computation comprises:
      compress the block in the second set of blocks to compute a second compressed representation;
      decompress the second compressed representation to compute a third recovered block; and
      compute a second quality loss, based on the second set of blocks, the third recovered block and the second compressed representation.

17. The non-transitory computer-readable medium of claim 15, wherein based on the first quality loss being less than the second quality loss, the block selection signal indicates that the second residual will be used to generate the second compressed residual representation, and
  wherein based on the second quality loss being less than the first quality loss, the block selection signal indicates that the block in the second set of blocks will be used to generate the compressed representation.

18. The non-transitory computer-readable medium of claim 15, wherein the instructions, when executed by the at least one processor, further causes the at least one processor to:
  partition the first residual into first residual blocks;
  wherein the recovered residual is generated by compressing a block included in the first residual blocks, using a third neural network, to obtain a first compressed residual representation; and
  wherein the first compressed residual representation is decompressed, using a fourth neural network, to obtain the recovered residual.

19. The non-transitory computer-readable medium of claim 18, wherein each of the first neural network, second neural network, third neural network, and fourth neural network are trained by:
  initializing a weight coefficient; and
  computing an overall loss and back-propagating a gradient of the overall loss to update a learnable parameter.

20. The non-transitory computer-readable medium of claim 16, wherein the instructions, when executed by the at least one processor, further causes the at least one processor to:
  partition the input in a plurality of ways;
  wherein the optimal partition is a way of partitioning the input resulting in a least quality loss from the second set of blocks; and
  wherein the set of pixels are selected from one of the set of previously recovered blocks and the set of previously recovered micro-blocks.

\* \* \* \* \*